(12) United States Patent
Olsson

(10) Patent No.: US 8,385,522 B2
(45) Date of Patent: Feb. 26, 2013

(54) METHOD FOR AWARDING DISCOUNT AND PROMOTIONS FOR DELAYED SERVICES TO SUBSCRIBERS CHARGED IN REAL TIME

(75) Inventor: Ake Olsson, Torhamn (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1295 days.

(21) Appl. No.: 11/720,501

(22) PCT Filed: Dec. 1, 2005

(86) PCT No.: PCT/EP2005/056384
§ 371 (c)(1),
(2), (4) Date: Aug. 14, 2007

(87) PCT Pub. No.: WO2006/058903
PCT Pub. Date: Jun. 8, 2006

(65) Prior Publication Data
US 2008/0144789 A1    Jun. 19, 2008

(30) Foreign Application Priority Data
Dec. 1, 2004    (EP) ...................................... 04028387

(51) Int. Cl.
*H04M 15/00*    (2006.01)

(52) U.S. Cl. .................................. 379/114.1; 379/114.12
(58) Field of Classification Search ............. 379/114.03, 379/114.1, 114.12, 114.17, 114.2, 121.02; 455/406
See application file for complete search history.

(56) References Cited

U.S. PATENT DOCUMENTS

| | | | |
|---|---|---|---|
| 7,860,806 B2 * | 12/2010 | Grundstrom et al. | 705/400 |
| 2003/0101135 A1 | 5/2003 | Myatt et al. | |
| 2005/0181759 A1 * | 8/2005 | Hundscheidt et al. | 455/408 |

FOREIGN PATENT DOCUMENTS

| | | |
|---|---|---|
| GB | 2 396 524 A | 6/2004 |
| WO | WO 02/51118 A | 6/2002 |
| WO | WO 03024135 A1 * | 3/2003 |

* cited by examiner

*Primary Examiner* — Quoc D Tran

(57) ABSTRACT

A method and system for updating the available amount of a service to be used by a user in a communications system, wherein a requested amount of a requested service is reserved if it is available. It is detected if a valid delivery of the requested service has been performed, if so, the delivered amount of said requested service is accumulated; and available amount is updated in dependence of the delivered amount.

14 Claims, 3 Drawing Sheets

METHOD FOR AWARDING DISCOUNT AND PROMOTIONS FOR DELAYED SERVICES TO SUBSCRIBERS CHARGED IN REAL TIME

This application is a National Stage of International Application No. PCT/EP2005/056384, filed Dec. 1, 2005, which claims the benefit of EP Application No. 04028387.1, filed Dec. 1, 2004, the disclosure of which is incorporated herein by reference.

FIELD OF THE INVENTION

The present invention relates generally to a method and system for rewarding users of services in a communications system, and more particularly to a method and system for changing the available amount of a service to be used by a user in a communications system.

DESCRIPTION OF THE PRIOR ART

Available prior art systems and methods for rewarding service usage in communications systems is based on storing the charged amount in a register per subscriber. This data can then be used in price and bonus calculations.

Generally, rating of service utilisation in communications systems, such as calls in telecommunications systems, is based on a number of parameters, including A-number, B-number, date, time etc. These parameters and additional information associated with the subscriber's account are used to decide the rate of the used service. Different discounting schemes and promotions applicable for both post-paid and pre-paid systems are then used for rewarding users or customers, based on for example a frequent request or large amount of usage of a service or other parameters. Other usage behaviour may give rise to other kind of discount or promotion, or even a penalise for less usage of a service.

According to one prior art system disclosed by GB-2367445, a customer's usage of the system during a particular charging period is monitored and, in accordance with the customer's usage during that charging period, the tariff for that customer is adjusted for a succeeding charging period so as to reward, or perhaps penalise, the customer. A reward, or a penalty, for a customer in respect of a particular type of call usage may be implemented by adjusting a threshold applicable to a different type of call usage: examples of various types of call usage are voice calls, text messaging, Internet calls, WAP and general packet radio (e.g. GPRS) calls.

Another system and method for usage in an electronic communication network, providing real-time updating of available network service access and changing of communication service level for subscribers in the network is disclosed in WO-0251118. A data processing system is configured to initialise a first parameter with a network service access starting value, i.e. account status, and a second parameter with a consumption value. The first parameter is decreased with an amount corresponding to a certain usage of communication services, and a second parameter is increased with the same amount. The computer processing means is further configured to initialise a third parameter with a threshold value, compare the consumption value with the threshold value, and change the service level for a subscriber depending on the comparing result.

Although, the WO-0251118 provides a system and method for real time updating of available service access, none of them provides credit control in real time while allowing bonus/promotions to be safely refunded for services not completed, like a non received SMS, MMS, EMS etc. The existing solution only works safely if no refund is made for service, e.g. messages never reaching their destination.

The problem associated with the prior art systems is that if the operator refunds discarded messages the bonus plan becomes vulnerable for fraud. The user can send a number of messages to a destination where they will not be accepted. In this case the user can manipulate its service level, i.e. the available amount of one or more services. Then it is possible to use free or discounted traffic towards real receiving subscribers.

There is also a risk that the user will be overcharged if the promotion allows a certain number of free messages per day. In this case the free messages may be consumed by discarded messages. This occurs if refund of free messages is done based on what have been paid for.

SUMMARY OF THE INVENTION

It is an object of the present invention to provide a method that overcomes the problem and disadvantages set forth above in connection with the prior art.

This object is achieved by a method for changing the available amount of one or more services to be used by a user in an electronic communications system depending on service usage, wherein in response to a service request initiated by a user command to the system, at least a quota of said available amount of service (100) is reserved (101,102). The method is characterised by the further steps of: detecting whether a valid delivery of at least a part of said requested service has been performed; accumulating an amount representing the delivered said at least part of said requested service; and changing the available amount of one or more services in dependence of said accumulated amount.

A more specific object of the invention is to provide a system and a computer program for working the method. This object is best described by the accompanying claims.

An advantage of the invention is that it enables discount and bonuses based on previous usage also for services where there is a time delay between request to delivery. Typical examples are sms, mms, ems or e-mail.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In order to explain the invention in more detail and the advantages and features of the invention, a preferred embodiment will be described in detail below, reference being made to the accompanying drawings, in which.

DETAILED DESCRIPTION OF THE INVENTION

Figure 1:
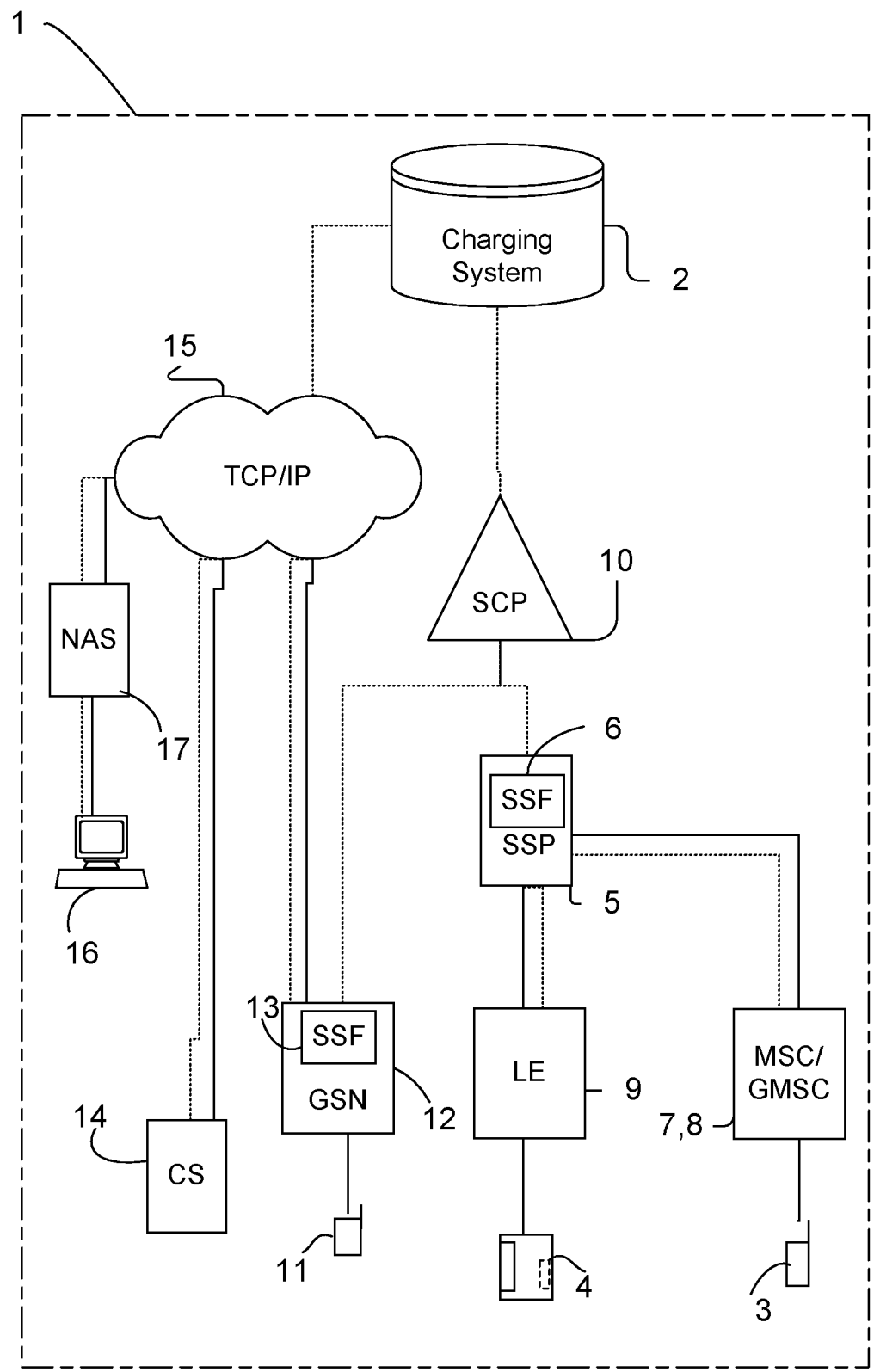
FIG. 1 is a schematic view of an embodiment of a communications network including a system according to the invention for updating the available amount of a service.

Referring to FIG. 1, there is shown an example of a communications network or system 1 with a charging system 2 that provides means for charging and rewarding and/or penalise users or customers of services provided by the communications system according to the invention. The communications system is, but is not limited to, for example a cellular mobile telephone network or PLMN (public land mobile network) including a service providing network, such as an intelligent network (IN) facilitating service delivery for subscribers connected to the network. In this embodiment, the network also provides a pre-pay option and a method for determining rating data for pre-paid services for subscribers in the communications network. The pre-pay option is only one example of a method for paying for services in a communications network, but this mechanism is not necessary for the invention. A post-pay option or other method of payment is likewise possible within the scope of the invention.

A user may access the charging system 2 providing a central charging and rating function CCRF via a number of access methods which is further described with reference to FIG. 1. If the charging system 2 is accessed via a user terminal such as a portable radio communication equipment 3 or a fixed telephone 4, the invocation is performed by a service switching point (SSP) 5 and its service switching function 6 via an intermediate MSC/GMSC 7/8 for the portable radio communication equipment 3 and a local exchange (LE) 9 for the fixed telephone 4 via the service control point SCP 10.

The term portable radio communication equipment, which herein after is referred to as a mobile phone, includes all equipment such as pagers, communicators, i.e. electronic organizers, smartphones or the like.

The GMSC 7, i.e. gateway mobile services switching centre, or only MSC 8, i.e. mobile services switching centre, provides specific data about individual mobile phones 3 in the network and operates as an interface towards other networks such as other PLMNs, ISDN or a public switched network (PSTN) in the communications system.

If the charging system is invoked due to usage via a mobile phone 11 with GPRS capabilities, a GSN 12 will directly invoke the charging system 2 by its co-located service switching function (SSF) 13 via the SCP 10. If invoked due to usage of a service at a content server (CS) 14 connected to the Internet 15 accessed from a data terminal 16 through a network access server (NAS) 17, the content server (CS) 14 can directly access the charging system 2 via a TCP/IP network, such as the Internet 15. Access to an application server via a mobile phone will operate in the same way as when accessing from the data terminal 16, wherein the GSN 12 is operating as the NAS 17.

One example of a requested service is an mms from a pre-pay subscriber in a PLMN. The subscriber has an account registered for one or more services at a service provider. The service element is for example an SSF via CAP or INAP, HLR via MAP, HSS (Home Subscriber Subsystem) and web servers/application servers via Diameter, SIP, open API via IP, i.e. OSA/Parlay, XML web-services via SOAP or any other server with an application requiring charging support, such as an e-commerce site movie/music server for streaming, a news site, WAP server or an SMSC/MMS-C. The charging input parameters includes for example an article identifier, number of events, kind of event, service, local time, destination number, originating or terminating location, distance, QoS, number of time slots, or utilised capacity etc.

Figure 2:
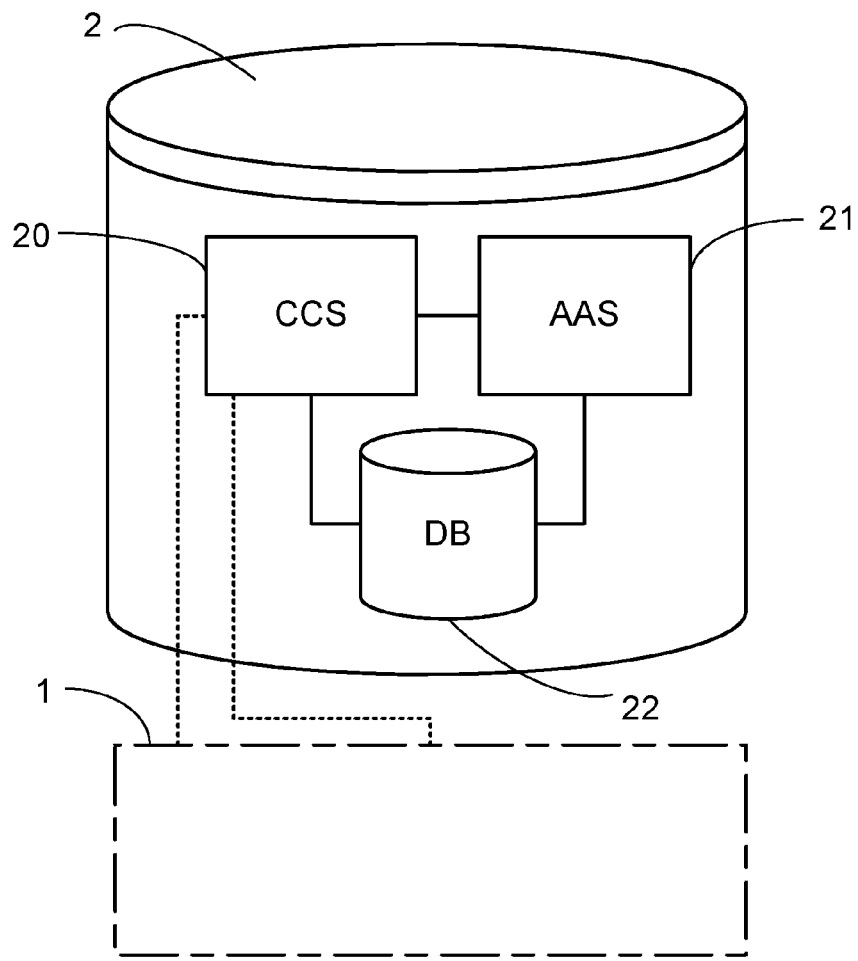
FIG. 2 is a schematic view of an embodiment of the system in FIG. 1 in further detail.

FIG. 2 shows the main entities of the charging system 2. The charging system 2 comprises among other entities a central charging system (CCS) 20, including the central charging and rating function, operatively connected to an award analysis system (AAS) 21. The CCS 20 and AAS 21 are operatively connected to a database (DB) 22. The database 22 stores service data needed for the service(s), including for example tariff data forming a tariff structure, subscriber data, group data etc. The tariff structure includes condition or nodes, that could be any one that is implemented for rating, promotion or accumulation such as time, day, location, type of call etc.

The charging system 2 provides a mechanism which allows operators to charge correctly, meaning the total price should be the same as if delivered messages where received immediately and all discarded messages are free.

Moreover, the mechanism ensures that all services are correctly charged. Thus still offering credit control as one of the core values of a real time charging system.

In order to facilitate this type of promotions, information is stored about how much service has been requested and how much was actually delivered. Calculations based on this is then performed two times. First at request of service and finally when the service is reported as finished, for example delivered or discarded.

To enable this functionality the charging system 2 distinguishes between amounts of requested services and delivered services.

A requested service is requested by the subscriber and accepted by the service node. For example, an mms (multimedia messaging service) is sent and accepted by an mmsc (multi-media messaging service centre) but not yet delivered to the recipient.

A delivered service is a service that has been accepted by the recipient. For example, an mms is received by a mobile terminal.

Figure 3:
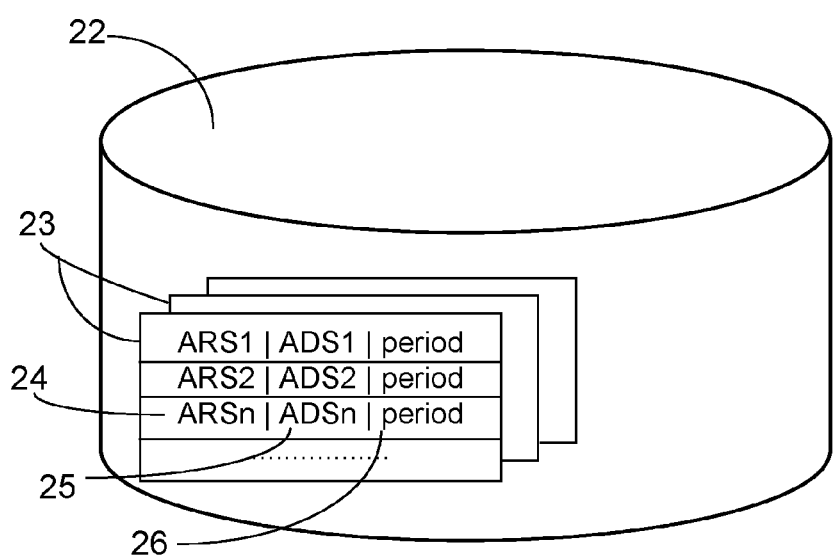
FIG. 3 is a schematic view of an embodiment of a database of the system in FIG. 2.

With reference to FIG. 3, the contents of the database DB 22 is shown. Each user has an account 23 with service related data for each service used by the respective user. For each service used as a qualifier for being awarded a bonus or discount, the charging system stores two parameter values in two registers: an accumulated requested service register (ARS) ARS1-ARSn 24 for accumulating a reserved at least quota if the available amount, and an accumulated delivered service register (ADS) ADS1-ADSn 25 for accumulating the amount representing the delivered at least part of the requested service, i.e. a pair of registers ARS and ADS for each service or group of services.

Calculation of price is performed at a request from the network 1 to the charging system 2 and ARS is updated. Updating of ADS is performed at acknowledge of success or failure of the delivered service. Information about whether the service was properly acknowledged or not or delivered with failure is sent to the charging system 2 from the network for updating the ARS 24 and ADS 25 parameter values accordingly. Different algorithms can be used to support different promotion schemes. A few examples is described below. However, the invention is not restricted to these examples.

In order to support calendar based periodical behaviour the registers must be possible to manipulate periodically. For example the register should be reset to zero at a periodical bases. Therefore, another parameter for the intended period 26 can also be stored in connection with the other parameters for the respective service.

There are two different calculation processes involved in the process of determining an award of bonus or promotion or even penalise, i.e. rating and promotion calculation, both addressing the same data structure.

Figure 4:
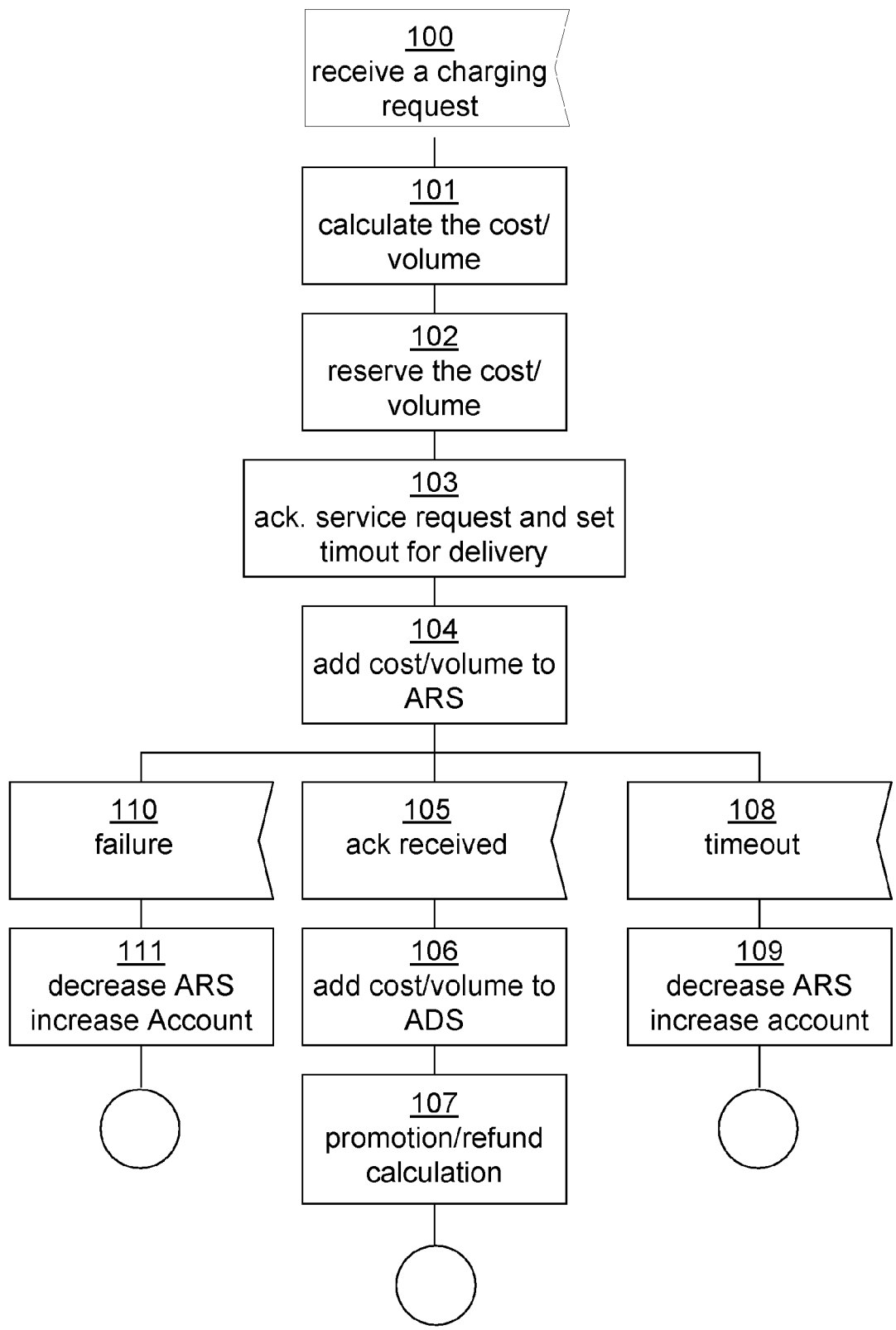
FIG. 4 is a flowchart of an embodiment of the method according to the invention for updating the available amount of a service.

The method according to the invention is described in connection with the flowchart of FIG. 4. The method is carried out by the charging system 2, including the central charging system (CCS) 20, the award analysis system (AAS) 21, all of which operate on data in the database (DB) 22, i.e. the accumulated requested service register (ARS) ARS1-ARSn 24 and the accumulated delivered service register (ADS) ADS1-ADSn 25, in response to a service request initiated by one of the above mentioned parties, such as a mobile phone call or an sms (short message service) or any other service. In this particular example a prepaid sms is sent from the mobile phone 3 to the mobile phone 4. The charging and rating function in the charging system 2 starts in step 100 triggered by a request received from the SSP 5 in response to a service request initiated by for example a user command via the network 1. At step 101 the tariff structure is traversed for calculation of the cost of the sms. Hence, step 101 may include one or more substeps, all of which are not described herein in detail. The central charging and rating function CCRF 22 collects or accesses charging input parameters or data such as: service data, subscriber related data, session data, call data, system data, accumulator data etc, received from the SSP 5 in this example of another external service element of a service requested by a subscriber.

All relevant rating data is transferred from the SSP 5 and the rating data is further complemented with data stored about the service in the DB 22. Hence, after the rating is performed the cost of the service, or part of it, is reserved at step 102.

At step 103 the charging system 2 acknowledges the service request and a timeout is set for acknowledgement of a delivery of the requested service.

The cost/volume of the service is deducted from the appropriate account and added to the accumulated requested service register (ARS) 24 at step 104.

If and when the service is delivered, i.e. the sms is received by the mobile phone 11, an acknowledgement signal is sent from the SSP 5 to the charging system 2. However, depending on the algorithm that is used to support the current promotion scheme for the requested service, the award analysis system (AAS) 21 of the charging system 2 await the acknowledgement signal and monitors if it is received before the expiry of the timeout.

If the delivery of the service is acknowledged properly within the timeout period at step 105, i.e. a valid delivery of the requested service has been performed, the rating data is complemented with the stored service data and the rate is used to determine the cost/volume of the delivered service. The accumulated delivered service register (ADS) 25 is updated with a value—added to the ADS 25—corresponding to the determined cost/volume of the delivered service at step 106. The promotion calculation and/or calculation of refund based on the accumulated delivered service register (ADS) 25 is performed at step 107.

For example, the service level for a user that has requested and got 50 mms delivered during a month can be changed by a promotion of 10 free mms to be used during the next month. Another example of promotion is that a user that has validly downloaded 10 Mbytes of information during a week can have its service level changed by a promotion of a 50% price reduction of the next 5 Mbytes of downloaded information, if it is used within a week. A user that has made regular phone calls for more than 1 hours a day the last 10 days can have a refund on his next invoice of an amount corresponding to a 1 hour phone call. However, the user may not only be promoted or be refunded in a value corresponding to the requested service, but also in a value corresponding to another service. For example, a user making a number of phone calls can be promoted with a number of sms, mms, an amount of data to be downloaded, etc.

However, if the timeout expires at step 108 for a requested service the process proceeds to step 109. The cost/volume of the service is decreased from the accumulated requested service register (ARS) 24 and added to the appropriate account at step 109.

When a service has been delayed to long or was delivered with failure, the charging system 2 receives a signal indicating the lack of delivery or failure from the network 1 at step 110. This signal is handled similar to the timeout expiry, i.e. the cost/volume of the service is decreased from the accumulated requested service register (ARS) 24 and added to the appropriate account at step 111.

At step 107, the charging system 2 determines if the period for promotion and/or refund calculation has expired. If not, depending on the algorithm for promotion calculation, the process is repeated according to step 100 to 107 for a number of service requests, sequentially and/or in parallel until the period expires.

A promotion account for the user and the ADS 25 are updated according to the result of the calculation(s). For example, the ADS 25 is reset at the end of the period. In case of a refund a charged register of the user is decreased with the value/volume of the service, but using the value of the corresponding last requested service according to ARS 24 as tariff condition.

The invention makes it possible for a pre-pay (network) operator delivering services where there is an undetermined delay between the request for service and the actual delivery, to apply discounts and bonuses in a correct and safe way. The end user will receive the expected bonus and pay the expected price and the operator will avoid potential loss caused by fraudulent behaviour. The payment can always be secured before allowing the request for service and the refund/promotion can always be calculated with respect to traffic actually delivered.

Although the invention has been described in conjunction with specific embodiments thereof this invention is susceptible of embodiments in different forms, with the understanding that the present disclosure is to be considered as an exemplification of the principles of the invention and is not intended to limit the invention to the specific embodiment illustrated.

The invention has been described in conjunction with sms and mms messages but the invention is not restricted to these services. Other examples of various types of services applicable to the invention is ems (enhanced messaging service) or email etc.

The method of the present invention is preferably implemented in computer software executable preferably by a data processing system including the charging system 20 forming part of the overall communication system. In this embodiment of the invention the charging system (20) comprises a computer apparatus including a computer processor for processing data and storage means connected to the computer processor for storing data on a storage medium, wherein said computer apparatus is configured to execute the steps of the method.

In addition, the invention also extends to programs on or in a carrier, adapted for putting the invention into practice. The program may be in the form of source code, object code a code suitable for use in the implementation of the method according to the invention. The carrier can be any entity or device capable of carrying the program. For example the carrier may be a record medium, computer memory, read-only memory or an electrical carrier signal.

Although the method is described in conjunction with an SMS or and MMS in an intelligent/CAMEL network the method is applicable on any communication session for example using the Internet Protocol. For example, the method and system according to the invention are applicable in other mobile telephone networks, public switched telecommunications networks (PSTN), ISDN, Internet, service networks etc., which provide many different more or less sophisticated tele and data communications services for users and providers.

The invention claimed is:

1. A method for changing an available amount of services to be used by a user in an electronic communications system depending on service usage, the method comprising the steps of:
receiving a request for service initiated by a user command from the user to the system;
reserving a quota for the requested service and adding the quota to an accumulated requested service register;
detecting whether a user-specified recipient of the user-requested service has actually received delivery of a part of said requested service and said delivery has been validated through an acknowledgement therefor;
in response to the acknowledgment of the valid delivery to the user-specified recipient, accumulating in an accumulated delivered service register, for the user, an amount representing the delivered part of said requested service; and
calculating a promotion or a refund for the user based on the amount in the accumulated delivered service register.

2. The method according to claim 1, further comprising, in response, to said service request, the step of accumulating said reserved at least quota of said requested service if it is available.

3. The method according to claim 2, comprising the further step of, if said requested service is not delivered within a predetermined time, reducing the accumulated quota(s) of said requested service(s) with the corresponding requested quota(s).

4. The method according to claim 2, comprising the further step of, if said requested service is not delivered correctly, detecting that a failure has occurred and reducing the accumulated quota(s) of said requested service with the corresponding requested quota(s).

5. The method according to claim 1, wherein before the step accumulating an amount representing the delivered said at least part of said requested service, the further step of calculating the amount representing the delivered part of said requested service based on the accumulated reserved quota.

6. The method according to claim 1, wherein a network communications service or access is requested as the service.

7. The method according to claim 6, wherein an sms, mms, ems, e-mail, or another information message is requested as the network communications service or access.

8. The method according to claim 1, wherein the available amount is updated for the requested service.

9. The method according to claim 1, wherein the available amount is updated for service other than the requested service.

10. A system for updating an available amount of a services to be used by a user in a communications system, the system comprising;
a processor configured to receive a request for service initiated by a user command from the user to the system;
the processor further configured to reserve, for the user, a quota of said available amount of services depending on service usage in response to a service request initiated by a user command from the user of the system and add the quota to an accumulated requested service register;
the processor further configured to detect whether a user-specified recipient of the requested service has actually received delivery of a part of said requested service and said delivery has been validated through an acknowledgement therefor;
in response to the acknowledgment of the valid delivery, the processor further configured to accumulate in an accumulated delivered service register, for the user, an amount representing the delivered part of said requested service; and
the processor further configured to calculate a promotion or a refund for the user based on the amount in the accumulated delivered service register.

11. The system as in claim 10, further comprising a central charging system, including a central charging and, rating function, operatively connected to an award analysis system said central charging system and award analysis system are operatively connected to a database.

12. The system as in claim 10, wherein each user has an account with service related data for each service used by the respective user, and for each service or group of services used as a qualifier for being awarded a bonus or discount, the charging system stores an accumulated requested service register for storage of the requested quota of said service and an accumulated delivered service register for storage of the delivered amount representing the delivered said part of said service or services.

13. The system as in claim 10, wherein said system is operating in a mobile communications system.

14. The system as in claim 10, wherein said system is an Internet protocol based system or a common channel signaling system.

* * * * *